(12) United States Patent
Kutuzov et al.

(10) Patent No.: US 10,887,390 B1
(45) Date of Patent: Jan. 5, 2021

(54) REMOTE ACCESS TO PUBLISHED RESOURCES

(71) Applicant: Parallels International GmbH, Schaffhausen (CH)

(72) Inventors: Alexey Kutuzov, Moscow (RU); Yury Averkiev, Singapore (SG); Matthew Cini Sarreo, Sliema (MT); Ian Sant, Sliema (MT); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 122 days.

(21) Appl. No.: 15/844,340

(22) Filed: Dec. 15, 2017

(51) Int. Cl.
*H04L 29/08* (2006.01)
*H04L 29/06* (2006.01)

(52) U.S. Cl.
CPC ........ *H04L 67/1097* (2013.01); *H04L 67/141* (2013.01); *H04L 67/18* (2013.01); *H04L 67/32* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 2008/0208957 | A1* | 8/2008 | Ding | H04L 9/3263 709/203 |
| 2008/0244724 | A1* | 10/2008 | Choe | H04L 63/1441 726/12 |
| 2011/0307947 | A1* | 12/2011 | Kariv | H04L 63/08 726/9 |
| 2012/0096271 | A1* | 4/2012 | Ramarathinam | G06F 9/45558 713/172 |
| 2012/0331521 | A1* | 12/2012 | Ansari | G06F 9/5072 726/3 |
| 2013/0060839 | A1* | 3/2013 | Van Biljon | H04M 15/66 709/203 |
| 2017/0201588 | A1* | 7/2017 | Schmidt | H04L 63/0876 |

* cited by examiner

*Primary Examiner* — Philip J Chea
*Assistant Examiner* — Hassan A Khan
(74) *Attorney, Agent, or Firm* — Lowenstein Sandler LLP

(57) ABSTRACT

A remote application connection manager, executed by a processing device, transmits a remote application connection request from the processing device to a remote application server. The remote application connection manager further receives one or more access compliance conditions for the processing device from the remote application server. Also, the remote application connection manager determines whether the processing device satisfies the one or more access compliance conditions and if the processing device does not satisfy the one or more access compliance conditions, the remote application connection manager determines whether the processing device has a configuration control right to update a configuration of the processing device to satisfy the one or more access compliance conditions. If the processing device has the configuration control right, the remote application connection manager updates the configuration of the processing device. In addition, the remote application connection manager establishes a connection to the remote application server.

17 Claims, 6 Drawing Sheets

REMOTE ACCESS TO PUBLISHED RESOURCES

TECHNICAL FIELD

Embodiments of this disclosure relate generally to computer systems and, more specifically, relate to a remote access connection for accessing published resources at a server over a network.

BACKGROUND

A remote access environment has client devices connected to a remote application server over a network. In such environment, the remote application server stores published resources such as desktops, applications, and documents and allows the client devices to remotely access the published resources that are running at the remote application server. Specifically, a client device can use applications by receiving only graphical images of the applications from the remote application server via remote desktop protocol (RDP), while the applications are executed at the remote application server. The remote application environment also allows the client devices to access the same type of desktop regardless of the various types of operating systems actually running on the client devices.

BRIEF DESCRIPTION OF THE DRAWINGS

Embodiments of the present disclosure will be understood more fully from the detailed description given below and from the accompanying drawings, which, however, should not be taken to limit the present disclosure to the specific embodiments, but are for explanation and understanding only.

DETAILED DESCRIPTION

Figure 1:
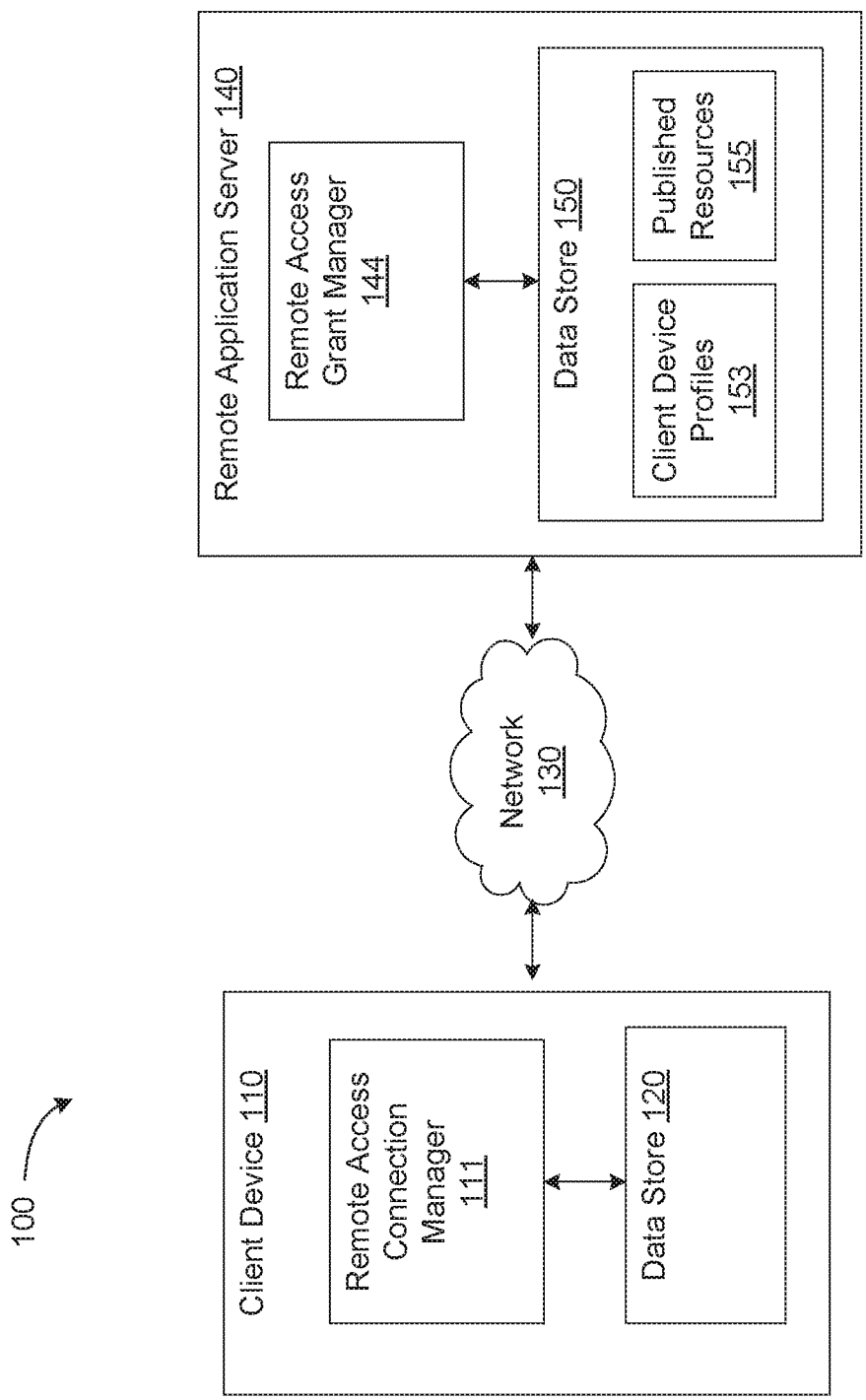
FIG. 1 is a block diagram illustrating a networked environment in which embodiments of the present disclosure may be implemented.

Described herein are methods and systems for enforcing compliance rules of a remote application server on client devices that are connected via a network. The remote application server stores published resources such as desktops, applications, and documents and allows the client devices to remotely access the published resources that are running at the remote application server. In a remote access environment, it may not be easy for the remote application server to enforce the compliance rules depending on the type of devices or operating systems installed on the client devices. Some operating systems mandate software or operating system updates or certain security settings, whereas other operating systems do not. Further, the process of updating the configuration of a client device to comply with the compliance requirements of the server can be complicated. In order to update the configuration of a client device in the remote access environment, the client device may need to download and install a separate executable file from the remote application server. In other times, the remote application server may need to determine whether to establish connection with the client device or whether to force the compliance. If the remote application server determines that the client devices do not comply with a compliance requirement, the server may need to send a request to a separate remediation server to manage the compliance.

In one embodiment, the remote access connection system described herein allows the remote application server to enforce the compliance requirements by requiring the client device to satisfy the requirements before establishing a remote access connection. When the client device attempts to establish the connection with the remote application server, a remote access connection manager installed in the client device may receive the compliance requirements from the server and internally check the configuration of the client device for compliance. If the client device is not in compliance, the remote access connection manager may automatically adjust the configuration when possible. If such an update to the automatic configuration is not possible, the remote access connection manager may prompt a manual configuration update by a user by providing corresponding instructions. Therefore, in one embodiment, the compliance check and subsequent remedial action can all be done at the client device with minimal involvement from the user and the remote application server.

In another embodiment, the remote access connection manager may limit access to one or more published resources depending on the client device's compliance status. There may be one or more mandatory compliance requirements imposed by the remote application server. If the client device does not satisfy the mandatory requirements, the remote access connection manager may indicate, in a list of one or more published resources available to the client device, that none can be accessed. If some requirements are met, however, including the mandatory ones, then the client device may have access to some published resources. Therefore, by restricting access to the published resources, the remote access connection manager can enforce compliance in a simple way. As such, the remote access management system reduces loads on the remote application server and speeds up the compliance check and its subsequent remediation action.

FIG. 1 is a block diagram illustrating a networked environment 100 in which embodiments of the present disclosure may be implemented. The networked environment 100 can include one or more client devices 110 and one or more remote application servers 140, which can be in data communication with each other via network 130. Computer system 600 illustrated in FIG. 6 may be one example of the client devices 110 or remote application servers 140. The network 130 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks. In some embodiments, there may be a gateway in between the client device 110 and remote application server 140.

The client device 110 may include processor-based systems such as computer systems. Such computer systems may be embodied in the form of desktop computers, laptop computers, personal digital assistants, cellular telephones, smartphones, tablet computer systems, game consoles, or other devices with similar capability. The client device 110 may request a remote access connection to the remote application server 140 and use one or more published resources 155 accessible at the remote application server 140. In one embodiment, the client device 110 includes a remote access connection manager 111 and a data store 120. The remote access connection manager 111 manages establishing the remote access connection, updating a configuration status of the client device 110, and enumerating available and/or accessible published resources 155. Additional details of the remote access connection manager 111 are provided below with respect to FIGS. 2-5.

The data store 120 may include one or more mass storage devices which can include, for example, flash memory, magnetic or optical disks, or tape drives, read-only memory (ROM), random access memory (RAM), erasable programmable memory (e.g. EPROM and EEPROM), flash memory, or any other type of storage medium. The data store 120 stores data received from the remote application server 140 and any other data used for the remote access connection.

The remote application server 140 may include, for example, a server computer or any other system providing computing capability. Alternatively, the remote application server 140 may employ a plurality of computing devices that may be arranged, for example, in one or more server banks or computer banks or other arrangements. Such computing devices may be positioned in a single location or may be distributed among many different geographical locations. For example, the remote application server 140 may include a plurality of computing devices that together may comprise a hosted computing resource, a grid computing resource and/or any other distributed computing arrangement. In some cases, the remote application server 140 may correspond to an elastic computing resource where the allotted capacity of processing, network, storage, or other computing-related resources may vary over time.

In some implementations, the remote application server 140 may provide published resources 155 to the client device 110 via a remote access connection over the network 130. In one embodiment, the remote application server 140 may impose one or more access compliance conditions on the client device 110 before establishing the remote access connection. The access compliance conditions may be specific conditions of an operating system setting, application setting, network security setting, registry key setting, Global Positioning System (GPS) location, network connection type, a file on a file system, or other configuration settings of the client device 110. There may be one or more mandatory or optional access compliance conditions. Also, the access compliance conditions may be specific to a published resource 155.

The remote application server 140 may include a remote access grant manager 144 and a data store 150. The remote access grant manager 144 may manage granting access to published resources 155 to the client device 110. As an illustrative example, the remote access grant manager 144 may communicate with the client device 110 to perform a compliance check and a subsequent remedial action on the client device 110, before granting the remote access connection. In some embodiments, the remote access grant manager 144 may be separate from a module that provides access to published resources 155 and load balances data traffic at the remote application server 140. In such case, the remote access grant manager 144 may function as a subscriber for information from the gateway that is located between the client device 110 and remote application server 140 and that may forward the information from the client device 110 to the remote application server 140. Implementations involving the gateway are described more in details with respect to FIG. 4 below.

The data store 150 may include one or more mass storage devices such as the data store 120 of the client device 110. In some implementations, the data store 150 may store client device profiles data 153 and published resources data 155. The client device profiles data 153 may include credentials of the client device 110, such as a remote access service membership identification number or an internet protocol (IP) address of the client device 110, connection policy of whether or not to impose access compliance conditions, a list of the access compliance conditions, a list of published resources 155 associated with the client device 110, and a list of configuration control rights of the remote access grant manager 144 and/or remote access connection manager 111. In some implementations, the configuration control right may be a privilege granted by the client device 110 to the right holder to update or modify a configuration of the client device 110. The configuration control right may involve the ability to change settings of an operating system, application, network security, and/or registry key.

Figure 2:
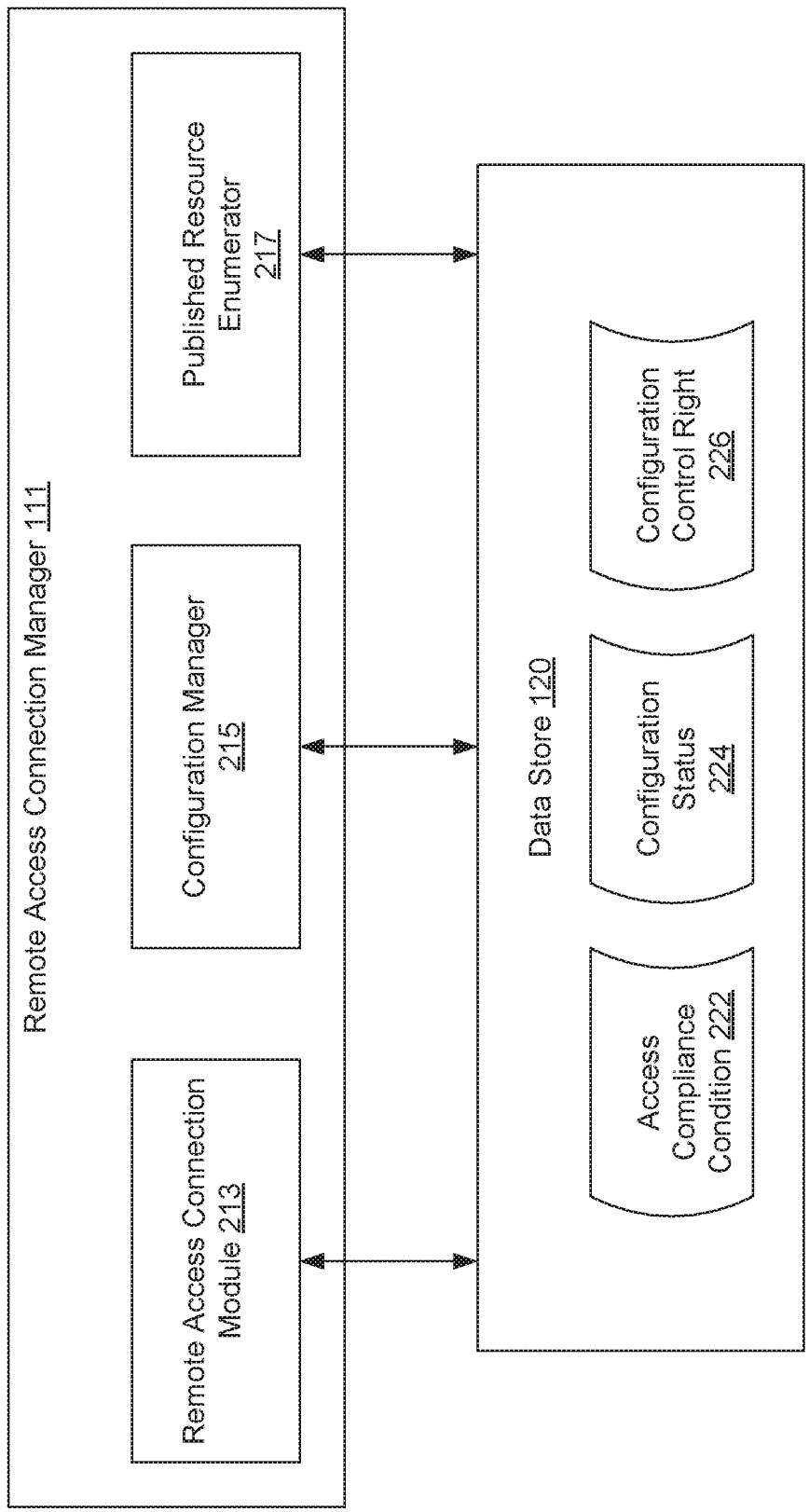
FIG. 2 is a block diagram illustrating a remote access connection manager, according to an embodiment.

FIG. 2 is a block diagram of one embodiment of a remote access connection manager 111 showing logical modules that may be executed by the client device 110. In some implementations, the remote access connection manager 111 can include a remote access connection module 213, a configuration manager 215, and a published resource enumerator 217. This arrangement of modules and components may be a logical separation, and in other embodiments, these modules or other components can be combined together or separated in further components. In some implementations, the components of the remote access connection module 213, configuration manager 215, and published resource enumerator 217 may be included on a single client device 110 (e.g., client device 110 of FIG. 1). Alternatively, the components of the remote access connection module 213, configuration manager 215, and published resource enumerator 217 may be divided across multiple client devices.

In one embodiment, the remote access connection module 213 communicates with the remote application server 140 to establish the remote access connection over the network 130. In an illustrative example, the remote access connection module 213 may transmit a remote access connection request and in turn, receive access compliance conditions for the client device 110 from the remote application server 140. Also, the remote access connection module 213 may ultimately establish a connection to the remote application server 140 by sending another remote access connection request with a confirmation that the client device 110 satisfies the access compliance conditions.

In one embodiment, the configuration manager 215 manages configuration updates in the client device 110 to satisfy the access compliance conditions. In an illustrative example, the configuration manager 215 may determine whether the client device 110 satisfies the access compliance conditions by comparing the current configuration status of the client device 110 against the conditions based on data stored in the access compliance condition data 222 and configuration status data 224. If the client device 110 does not comply with the access compliance conditions, then the configuration manager 215 may prompt an update to the configuration of the client device 110. The configuration manager 215 may either initiate an automatic configuration update or request a manual configuration update.

In the automatic configuration update, the configuration manager 215 may determine whether the remote access connection manager 111 or the remote application server 140 has a configuration control right to modify the configuration of the client device 110. The configuration manager 215 may access the configuration control right data 226 to make this determination. Once the configuration manager 215 determines that either the remote access connection manager 111 or remote application server 140 has the configuration control right, the configuration manager 215 may initiate the automatic configuration update. In case the remote application server 140 has the configuration control right, the configuration manager 215 may request that the remote application server 140 send a control command to adjust the configuration of the client device 110. On the other hand, in case of the manual configuration update, the configuration manager 215 may notify the user of the noncompliance and provide instructions to appropriately change the configuration at the client device 110.

In one embodiment, the published resource enumerator 217 may provide a list of published resources 155 available to the client device 110. In the list, the published resource enumerator 217 may indicate accessibility of the published resources 155 based on the current configuration status of the client device 110. The client device 110 may have full access or partial access to the published resources 155 depending on how much the client device 110 satisfies the access compliance conditions. The published resource enumerator 217 may indicate that the client device 110 would have full access to all the published resources 155, if the client device 110 satisfies all or at least a threshold amount of the access compliance conditions. On the other hand, the client device 110 would have partial access to a subset of the published resources 155, if the client device 110 satisfies less than the threshold amount of the access compliance conditions. The published resource enumerator 217 may indicate that only some published resources 155 can be accessed by displaying all the published resources 155 associated with the client device 110, but identifying the inaccessible published resources 155 due to lack of compliance. In another embodiment, if the client device 110 does not satisfy mandatory access compliance conditions, the published resource enumerator 217 may indicate in the list of available published resources 155 that none of the published resources 155 is accessible. In such case, the client device 110 may not be able to launch any of the published resources 155.

The data store 120 of the client device 110 can include access compliance condition data 222, configuration status data 224, and configuration control right data 226. The access compliance condition data 222 may include the access compliance conditions downloaded from the remote application server 140. The configuration status data 224 may store the current configuration status of the client device 110. The list of the configuration status may vary depending on the access compliance conditions required by the remote application server 140. The configuration control right data 226 may have a list of configuration control rights for the remote access connection manager 111 and/or remote access grant manager 144. The list may be received from the remote application server 140 as well.

Figure 3:
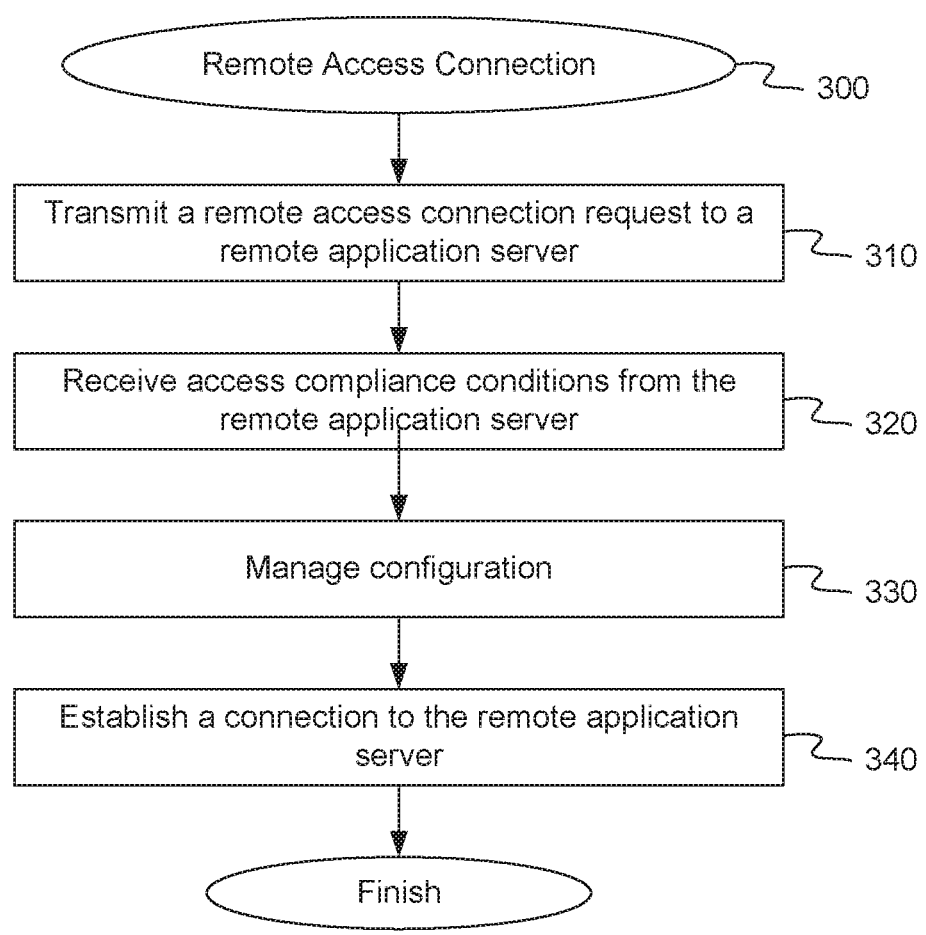
FIG. 3 is a flow diagram illustrating a method of remote access connection, according to an embodiment.
Figure 4:
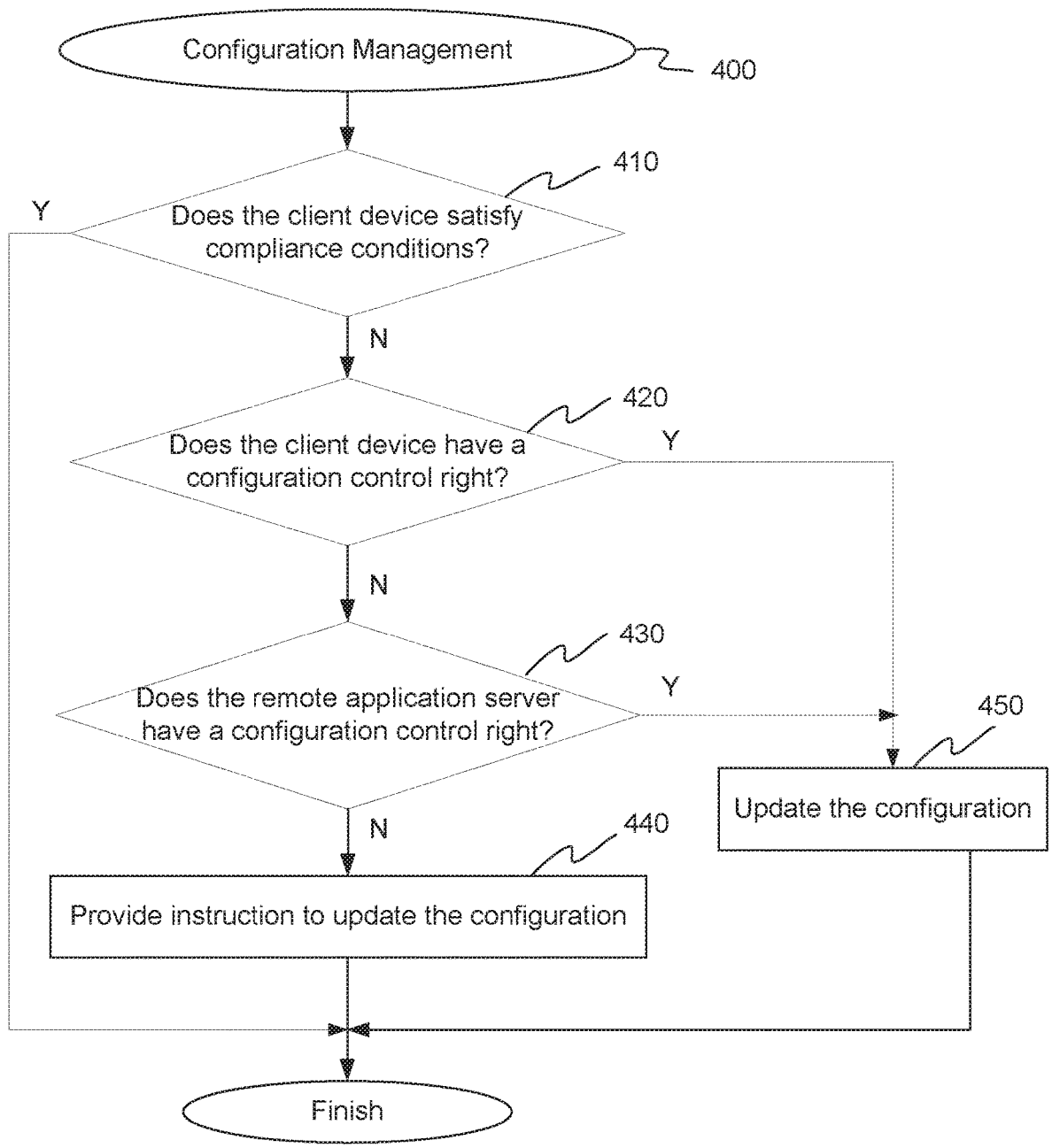
FIG. 4 is a flow diagram illustrating a method of configuration management, according to an embodiment.
Figure 5:
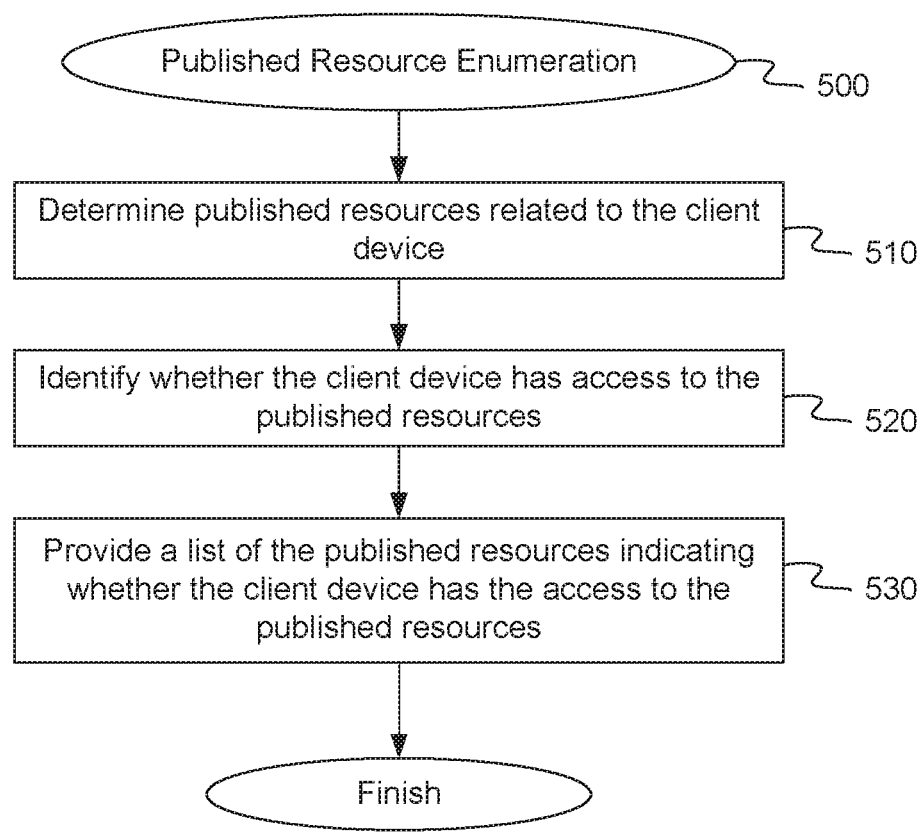
FIG. 5 is a flow diagram illustrating a method of published resource enumeration, according to an embodiment.

FIGS. 3-5 are flow diagrams of various implementations of methods related to remote access connection and published resource enumeration after the remote access connection is established. The methods are performed by processing logic that may include hardware (circuitry, dedicated logic, etc.), software (such as is run on a general purpose computer system or a dedicated machine), or a combination of both. Some methods may be performed by the remote access connection manager 111 of FIGS. 1 and 2.

For simplicity of explanation, the methods are depicted and described as a series of acts. However, acts in accordance with this disclosure can occur in various orders and/or concurrently, and with other acts not presented and described herein. Further, not all illustrated acts may be required to implement the methods in accordance with the disclosed subject matter. In addition, those skilled in the art will understand and appreciate that the methods could alternatively be represented as a series of interrelated states via a state diagram or events.

FIG. 3 is a flow diagram illustrating an embodiment for a method 300 of establishing a remote access connection between client device 110 and remote application server 140. At block 310, the method 300 transmits a remote access connection request to the remote application server 140. The remote access connection request may be a network packet and contain an address of the remote application server 140 and credentials of the client device 110. In one embodiment, the remote access connection module 213 of the remote access connection manager 111 may receive a request from a user or application running on client device 110 to create a remote access connection. Then, the remote access connection module 213 in turn, may create a packet that contains the remote access connection request and transmit the packet to the remote application server 140 over the network 130.

At block 320, the method 300 receives access compliance conditions from the remote application server 140. The access compliance condition can be that of the an operating system setting, an application setting, a network security setting, a registry key, a GPS location, a network connection type, or a file on a file system. For example, the conditions for the operating system settings may be that the Windows® updates are up-to-date, the iOS® is not jailbroken, or the Android® operating system is not rooted. For the application settings, the condition may include that the version of software instructing the remote access connection manager 111 be up-to-date, a process with a specific name and path is running on the client device 110, and presence of certain files. Some examples of the network security setting conditions can be that anti-virus software be installed and enabled, anti-virus definitions are up-to-date, and firewall be enabled. As for the registry key settings, the remote application server 140 may require presence of certain registry entries and/or files on the client device 110 and a specific registry value. Further, the remote application server 140 may require a GPS location of the client device 110 be within a particular zone to access some published resources 155. Similarly, the remote application server 140 may impose a condition on a particular network connection types such as a computer domain membership, wired or Wi-Fi internet connection, and public or secure network. Examples of a file on a file system of the client device 110 may include anti-virus software, anti-virus definitions, registry entries, patches and updates of an operating system, and a version of software instructing the remote application connection manager 111.

In some embodiments, an administrator of the remote application server 140 may set the access compliance conditions. The access compliance conditions may include mandatory and/or optional conditions. If the client device 110 does not satisfy the mandatory conditions, the client device 110 may not have access to any published resources 155 as discussed in block 520. On the other hand, as long as the client device 110 satisfies the mandatory conditions, the client device 110 may be able to access some published resources 155, even if the client device 110 does not satisfy some optional access compliance conditions. The access compliance conditions can be generally applicable to any client devices 110. In some embodiments, the administrator of the remote application server 140 may set the conditions to be specific to a particular client device 110 and/or a particular published resource 155.

In some implementations, upon receiving the remote access connection request from the remote access connection module 213, the remote access grant manager 144 of the remote application server 140 may check whether a connection policy is applicable to the client device 110. Also, the remote access grant manager 144 may determine whether the client device 110 belongs to a group membership where a particular connection policy is enforced. If there exists a connection policy, the remote access grant manager 144 may identify corresponding access compliance conditions for the client device 110. Then, the remote access grant manager 144 may transmit the conditions to the client device 110. At the client device 110, the remote access connection module 213 may receive the access compliance conditions and store them in the access compliance condition data 222.

At block 330, the method 300 manages configuration of the client device 110. In one embodiment, the configuration manager 215 of the remote access connection manager 111 may update the configuration of the client device 110 to comply with the access compliance conditions, as needed. The configuration management process will be discussed in detail in relation to FIG. 4 below.

At block 340, the method 300 establishes a connection to the remote application server 140. The remote access connection may be automatically established by the remote access connection module 213 after the configuration management. For example, if either the client device 110 or remote application server 140 can automatically update configuration of the client device 110, then the remote access connection module 213 may proceed to automatically establish the connection with the remote application server 140 without receiving another connection request from the user. In one embodiment, to establish the remote access connection, the remote access connection module 213 may automatically send another remote access connection request with a confirmation that the client device 110 satisfies the access compliance conditions. Even if the client device 110 does not comply with all of the access compliance conditions, the client device 110 and/or remote application server 140 may allow the connection to be established. However, in case a user needs to manually update configuration of the client device 110, the user may need to re-request the remote access connection and the method 300 may be performed again.

FIG. 4 is a flow diagram illustrating an embodiment for a method 400 of managing configuration of the client device 110. At block 410, the method 400 determines whether the client device 110 satisfies access compliance conditions. In one embodiment, the configuration manager 215 may compare the access compliance condition against the configuration status of the client device to determine if the client device 110 satisfies the condition imposed by the remote application server 140.

For example, the access compliance condition may require anti-virus software be installed and active on the client device 110. The configuration manager 215 may check configuration status of the client device 110 as to whether or not the anti-virus software is installed and if so, whether the anti-virus software is active. The configuration manager 215 may access the access compliance condition data 222 to determine what conditions are imposed by the remote access server 140. The remote access connection module 213 or configuration manager 215 may update and maintain the access compliance condition data 222 as the remote access connection module 213 receives the condition data from the remote application server 140. The configuration manager 215 may check the current status of the configuration of the client device 110 by accessing the configuration status data 224.

In some embodiments, the configuration manager 215 may only check whether the mandatory access compliance conditions are in satisfied. In other embodiments, the configuration manager 215 may determine that the client device 110 does not satisfy the access compliance conditions if all of them are not in compliance. If the method 400 determines that the client device 110 satisfies the access compliance conditions, then the method 400 finishes the configuration management. Then, the remote access connection module 213 may establish the connection to the remote application server 140 at block 340 of the method 300 in FIG. 3.

On the other hand, if the configuration manager 215 determines that the client device 110 does not satisfy the access compliance conditions, at block 420, the method 400 determines whether the remote access connection manager 111 has a configuration control right to update a configuration of the client device 110 to satisfy the access compliance conditions. The configuration control right may involve the ability to update or modify settings of an operating system, application, network security, or registry key of the client device 110. Some examples of the client device 110's configuration control rights include downloading and installing Windows® update, anti-virus software, and anti-virus definition, enabling the anti-virus software and firewall, or correcting invalid registry value.

The client device 110 may grant the configuration control right to the remote access connection manager 111 and remote access grant manager 144 when the user of the client device 110 registers for the remote access connection service. The list of the configuration control right may be updated on an on-going basis by the administrator of the remote application server 140 with the permission of the user of the client device 110. The configuration manager 215 may download the configuration control right list from the remote application server 140 and keep the information up to date before or during the configuration management 400.

Referring back to the block 420, if the remote access connection manager 111 has the configuration control right, then block 450 updates the configuration of the client device 110. However, if the client device 110 does not have the configuration control right, at block 430, the method 400 determines whether the remote application server 140 has the configuration control right. Some examples of the remote application server's 140 configuration control rights include downloading and installing anti-virus software, anti-virus definition, and registry entry, enabling the anti-virus software and firewall, or correcting invalid registry value.

Referring back to block 430, if the method 400 determines that the remote application server 140 has the configuration control right, the method 400 updates the configuration of the client device 110 at block 450. In one embodiment, the configuration manager 215 may transmit a configuration update request to the remote application server 140. Then, the remote access grant manager 144 may send a packet that has control commands to update the configuration of the client device 110. In another embodiment, the remote access grant manager 144 may check the client device profiles data 153 to determine whether the remote application server 140 has the configuration control right before sending the control command packet. The configuration manager 215 may receive the control command packet and perform the update on the client device 110 based on the control commands from the remote application server 140.

For example, if the access compliance condition requires the Windows® updates to be up-to-date, but the configuration manager 215 determines that the Windows® updates are out of the date, the configuration manager 215 may check if the remote access connection manager 111 has the corresponding configuration control right by looking up the configuration control right data 226. If the remote access connection manager 111 has the configuration control right, the configuration manager 215 may initiate downloading and installation of the most recent Windows® update.

In another example, if the access compliance condition requires presence of a particular registry entry and the configuration manager 215 may determine that the client device 110 does not have the entry. Then, the configuration manager 215 may first check if the remote access connection manager 111 has the configuration control right to download and install the registry entry. If the remote access connection manager 111 does not have the configuration control right, the configuration manager 215 may check if the remote access grant manager 144 has the configuration control right. If so, the configuration manager 215 may request the remote access grant manager 144, to update the configuration status of the client device 110. The remote access grant manager 144 in response, may transmit a control command packet including instructions to download and install the specific registry entry to the 110. In another embodiment, the configuration manager 215 may check the configuration control right of the remote access grant manager 144 first and then that of the remote access connection manager 111.

On the other hand, if neither the remote access connection manager 111 nor the remote application server 140 has the configuration control right to remedy an access compliance condition, then at block 440, the method 400 provides instructions to update the configuration for presentation on the client device 110. In one embodiment, the configuration manager 215 may generate a notification message for a user which informs of the noncompliance and includes the instruction as to how to update the configuration of the client device 110. The configuration manager 215 may prompt an update of the configuration by a user of the client device 110 for the access compliance conditions such as the most recent version of software instructing the remote access connection manager 111, presence of certain files, jailbreak status for iOS®, rooting status for Android®, a network connection type including domain membership, wired or Wi-Fi, public or secured connection.

In another embodiment, after determining that the client device 110 does not satisfy the access compliance conditions at block 410, the configuration manager 215 may generate a message notifying the user of the non-compliance of the condition and prompting an automatic or manual configuration update of the client device 110. If the configuration manager 215 receives a selection of the automatic configuration update, then the configuration manager 215 may proceed to the block 450 to automatically update the configuration if either the remote access connection manager 111 or remote access grant manager 144 has the configuration control right to do so. Otherwise, the configuration manager 215 may provide the user with instructions for the manual configuration update.

Consequently, once the method 400 finishes the configuration management by either updating the configuration at block 450 or providing the instruction to update the configuration at block 440, the remote access connection module 213 may establish a connection to the remote application server 140 at block 340 in the method 300 of FIG. 3. In some embodiments, the method 400 may be performed for each access compliance condition. The method 400 may be repeated until all conditions are met or only mandatory conditions are fulfilled.

In some embodiments where there is a gateway between the client device 110 and the remote application server 140, the gateway may enable communication between the client device 110 and the remote application server 140. For example, the gateway may receive device information such as credentials of the client device 110 in a remote access connection request from the client device 110 and forward the information to the remote application server 140. The gateway may also receive device commands such as configuration commands to update configuration of the client device 110 from the remote application server 140. In response, the gateway may transmit the device commands to the client device 110.

FIG. 5 is a flow diagram illustrating an embodiment for a method 500 of enumerating published resources 155 for the client device 110. In some embodiments, the published resource enumeration method 500 is performed after the connection to the remote access server 140 is established in the remote access connection 300. A published resource 155 can be an application, desktop or operating system, document, and published URL available to the client device 110 for use via the remote access connection to the remote application server 140, but actually running on the remote application server 140.

At block 510, the method 500 determines published resources 155 related to the client device 110. In one embodiment, the remote access connection manager 111 may receive a list of published resources 155 for the client device 110 from the remote application server 140 based on the credentials of the client device 110, after the connection is established. Then the published resource enumerator 217 may identify the published resources 155 assigned to the client device 110.

At block 520, the method 500 identifies whether the client device 110 has access to the published resources 155. Depending on the updated configuration of the client device 110 in the configuration management 400, the client device 110 may or may not have a full access to the published resources 155 listed. When the client device 110 does not have access to a published resource 155, the client device 110 may not be able to launch the published resource 155 at the remote application server 140, even though the published resource 155 is assigned to be available to the client device 110.

As an illustrative example, if the client device 110 does not satisfy the mandatory access compliance conditions imposed by the remote application server 140, the client device 110 may not be able to use any of the published resources 155. In particular, the published resource enumerator 217 may first identify mandatory access compliance conditions from the access compliance conditions received in operation 320 of the remote access connection 300, by accessing the access compliance condition data 222. Then, the published resource enumerator 217 may check whether the corresponding configuration of the client device 110 satisfy the mandatory access compliance conditions. If a configuration for the mandatory access compliance conditions has not been updated to comply with the conditions in the configuration management 400, the published resource enumerator 217 may identify that the client device 110 does not have access to any published resources 155 in the list. In another embodiment, each published resource 155 may have different configuration requirements. Accordingly, depending on which configuration is updated via the configuration management 400, the published resource enumerator 217 may determine that some published resources 155 are available to the client device 110 while other published resources 155 are not available.

In some embodiments, the remote application server 140 may have a list of predefined areas and associate the areas with published resources 155. Thus, to identify whether the client device 110 has access to these geographic-specific published resources 155, the published resource enumerator 217 may send the GPS location of the client device 110 to the remote application server 140. Then the remote application server 140 may calculate if the client device 110 is within a predefined zone and if so, notifies the published resource enumerator 217 of the accessibility of the published resources 155 associated to the zone. In another embodiment, the published resource enumerator 217 may use the list of predefined areas and their association with the published resources 155 stored in the access compliance condition data 222. In such case, the published resource enumerator 217 may check the GPS location against the list to determine whether the published resources 155 are accessible.

Similarly, the remote application server 140 may have a separate list of published resources 155 accessible for various types of network connections. For example, some published resources 155 may be accessible only via wired connection and not wireless connection. In one embodiment, the published resource enumerator 217 may send the network type of the client device 110 to the remote application server 140. Then, the remote application server 140 may determine which published resources 155 are accessible for the specific network type and notify the published resource enumerator 217 of the published resources 155 associated with the specific network type. In another embodiment, the 217 may determine the accessibility based on the list of published resources 155 accessible for different types of network connections stored in the access compliance condition data 222.

At block 530, the method 500 provides a list of the published resources 155 indicating whether the client device 110 has the access to the published resources 155. In particular, based on the determination that which published resources 155 are available, the published resource enumerator 217 may provide the full list of published resources 155 for presentation and indicate in the list that which published resources 155 can be launched and which cannot. The published resource enumerator 217 may disable selection of inaccessible published resources 155 on the display. In another embodiment, the published resource enumerator 217 may provide a message to the user listing published resources 155 that are available and not available.

For example, if the client device 110 does not satisfy the mandatory access compliance conditions, no published resources 155 may be accessed. If at least the mandatory access compliance conditions are satisfied, then the published resource enumerator 217 may indicate that some published resources 155 can be launched. Moreover, if all access compliance conditions are satisfied, then the published resource enumerator 217 may present the full list of the published resources 155 as being accessible. In another embodiment, if a user attempts to launch an inaccessible published resource 155, the published resource enumerator 217 may show a message explaining instructions for a corresponding configuration to be in compliance with the access compliance condition required by the particular published resource.

Figure 6:
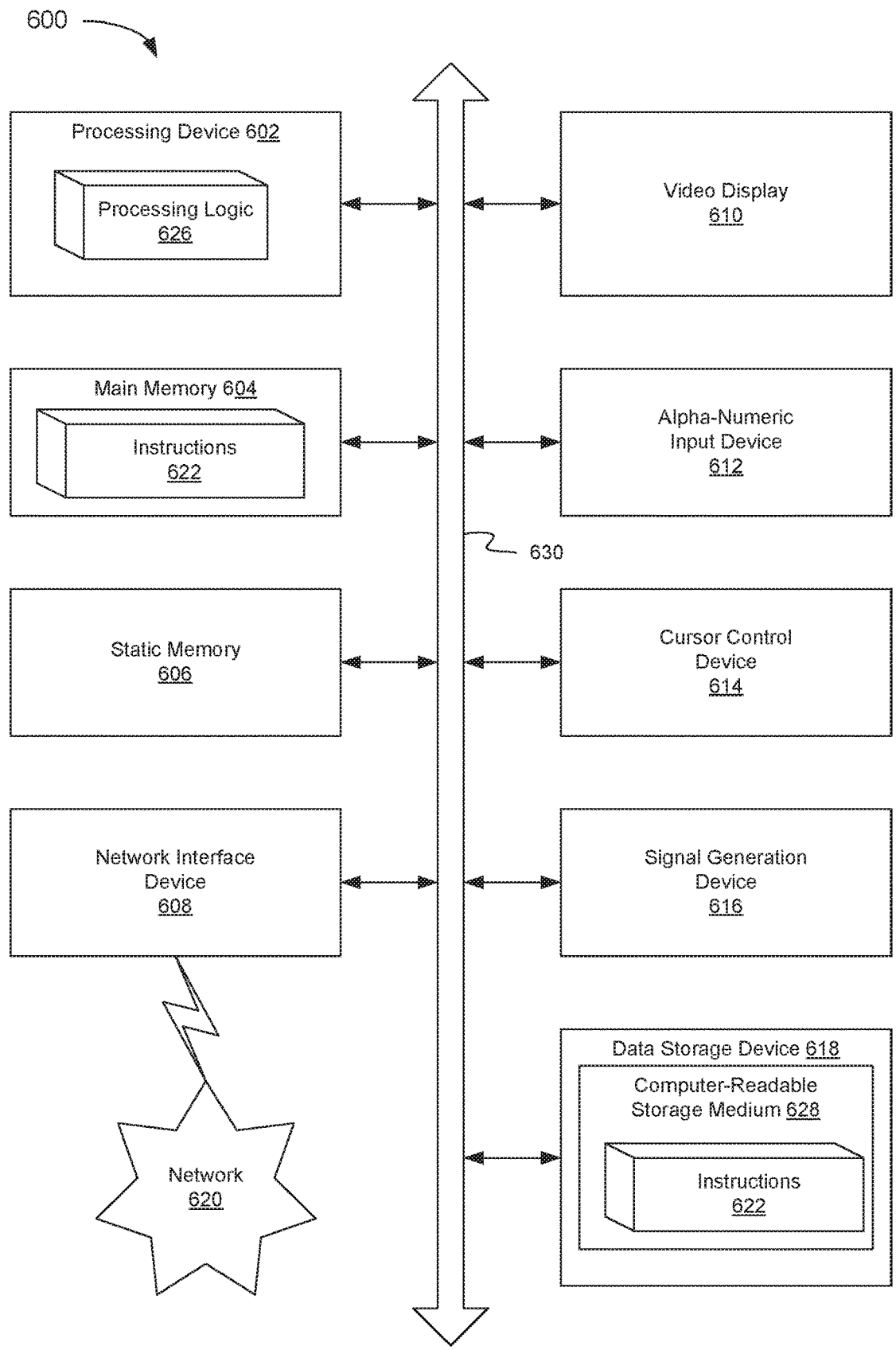
FIG. 6 is a block diagram illustrating an exemplary computer system on which embodiments of the present disclosure may be implemented.

FIG. 6 illustrates a diagrammatic representation of a machine in the exemplary form of a computer system 600 within which a set of instructions, for causing the machine to perform any one or more of the methodologies discussed herein, may be executed. For example, the instructions may cause the machine to perform document classification for use in filtering document search results. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may represent the client device 110 of FIGS. 1 and 2.

The exemplary computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein. In one embodiment, processing logic 626 is representative of remote access connection manager 111 of FIGS. 1 and 2.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions 622 (e.g., instructions of the remote access connection manager 111 embodying any one or more of the methodologies or functions described herein). The instructions 622 may also reside, completely or at least partially, within the main memory 604 and/or within processing logic 626 of the processing device 602 during execution thereof by the computer system 600, the main memory 604 and the processing device 602 also constituting computer-readable media. The instructions may further be transmitted or received over a network 620 via the network interface device 608.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "obtaining", "maintaining", "analyzing", "receiving," "identifying," "determining," "providing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

transmitting, by a processing device of a client device, a remote application connection request from the client device to a remote application server via a network;

prior to establishing a connection to the remote application server, invoking a remote access connection manager (RACM) installed in the client device to ensure that the client device satisfies one or more access compliance conditions associated with access to published resources running at the remote application server, wherein the RACM installed in the client device is to ensure that the client device satisfies the one or more access compliance conditions by:

receiving, by the RACM installed in the client device, the one or more access compliance conditions for the client device from the remote application server via the network;

determining, by the RACM installed in the client device, whether configuration of the client device satisfies the one or more access compliance conditions received by the processing device of the client device from the remote application server via the network;

responsive to determining, by the RACM installed in the client device, that the configuration of the client device does not satisfy the one or more access compliance conditions received by the processing device of the client device from the remote application server via the network, determining, by the RACM installed in the client device, whether the client device has a configuration control right to update the configuration of the client device to satisfy the one or more access compliance conditions; and responsive to determining that the client device has the configuration control right, updating, by the RACM installed in the client device, the configuration of the client device; and upon ensuring, by the RACM, that the client device satisfies the one or more access compliance conditions, establishing, by the processing device of the client device, the connection to the remote application server running the published resources.

2. The method of claim 1, further comprising:

after establishing the connection to the remote application server, determining one or more of the published resources related to the client device;

determining whether the client device has full access or partial access to the one or more published resources based on the updated configuration; and providing a list of the one or more published resources indicating whether the client device has the full access or the partial access to the one or more published resources for presentation on the client device.

3. The method of claim 2, wherein determining whether the client device has the full access or partial access to the one or more published resources based on the updated configuration further comprising:

determining whether the updated configuration of the client device satisfies one or more mandatory access compliance conditions in the one or more access compliance conditions; and responsive to determining that the updated configuration of the client device does not satisfy the one or more mandatory access compliance conditions, determining that the client device has no access to the one or more published resources.

4. The method of claim 1, further comprising:

responsive to determining that the client device does not have the configuration control right, determining whether the remote application server has the configuration control right to update the configuration of the client device to satisfy the one or more access compliance conditions.

5. The method of claim 4, further comprising:

responsive to determining that the remote application server has the configuration control right, transmitting a configuration update request to update the configuration of the client device from the client device to the remote application server; and responsive to determining that the remote application server does not have the configuration control right, providing an instruction to update the configuration for presentation on the client device.

6. The method of claim 1, wherein the configuration of the client device comprising at least one of:

an operating system setting of the client device;

an application setting of the client device;

a network security setting of the client device;

a registry key of the client device;

a Global Position System (GPS) location of the client device;

a network connection type of the client device; or a file on a file system of the client device.

7. A system for a client device comprising:

a memory; and a processing device of the client device operatively coupled to the memory, the processing device of the client device to:

transmit a remote application connection request from the client device to a remote application server via a network;

prior to establishing a connection to the remote application server, invoke a remote access connection manager (RACM) installed in the client device to ensure that the client device satisfies one or more access compliance conditions associated with access to published resources running at the remote application server, wherein to ensure that the client device satisfies the one or more access compliance conditions, the RACM is to:

receive the one or more access compliance conditions for the client device from the remote application server via the network;

determine whether configuration of the client device satisfies the one or more access compliance conditions received by the processing device of the client device from the remote application server via the network;

responsive to determining that the configuration of the client device does not satisfy the one or more access compliance conditions received by the processing device of the client device from the remote application server via the network, determine whether the client device has a configuration control right to update the configuration of the client device to satisfy the one or more access compliance conditions; and responsive to determining that the client device has the configuration control right, update the configuration of the client device; and upon ensuring, by the RACM, that the client device satisfies the one or more access compliance conditions, establish the connection to the remote application server running the published resources.

8. The system of claim 7, wherein the processing device is further to:

after establishing the connection to the remote application server, determine one or more of the published resources related to the client device;

determine whether the client device has full access or partial access to the one or more published resources based on the updated configuration; and provide a list of the one or more published resources indicating whether the client device has the full access or the partial access to the one or more published resources for presentation on the client device.

9. The system of claim 8, wherein to determine whether the client device has the full access or partial access to the one or more published resources based on the updated configuration, the processing device is further to:

determine whether the updated configuration of the client device satisfies one or more mandatory access compliance conditions in the one or more access compliance conditions; and responsive to determining that the updated configuration of the client device does not satisfy the one or more mandatory access compliance conditions, determine that the client device has no access to the one or more published resources.

10. The system of claim 7, wherein the processing device is further to:

responsive to determining that the client device does not have the configuration control right, determine whether the remote application server has the configuration control right to update the configuration of the client device to satisfy the one or more access compliance conditions.

11. The system of claim 10, wherein the processing device is further to:
responsive to determining that the remote application server has the configuration control right, transmit a configuration update request to update the configuration of the client device from the client device to the remote application server; and
responsive to determining that the remote application server does not have the configuration control right, provide an instruction to update the configuration for presentation on the client device.

12. The system of claim 7, wherein the configuration of the client device comprising at least one of:
an operating system setting of the client device;
an application setting of the client device;
a network security setting of the client device;
a registry key of the client device;
a Global Position System (GPS) location of the client device;
a network connection type of the client device; or
a file on a file system of the client device.

13. A non-transitory computer readable storage medium storing instructions that, when executed by a processing device of a client device, cause the processing device of the client device to:
transmit a remote application connection request from the client device to a remote application server via a network;
prior to establishing a connection to the remote application server, invoke a remote access connection manager (RACM) installed in the client device to ensure that the client device satisfies one or more access compliance conditions associated with access to published resources running at the remote application server, wherein to ensure that the client device satisfies the one or more access compliance conditions, the RACM is to:
receive the one or more access compliance conditions for the client device from the remote application server via the network;
determine whether configuration of the client device satisfies the one or more access compliance conditions received by the processing device of the client device from the remote application server via the network;
responsive to determining that the configuration of the client device does not satisfy the one or more access compliance conditions received by the processing device of the client device from the remote application server via the network, determine whether the client device has a configuration control right to update the configuration of the client device to satisfy the one or more access compliance conditions; and
responsive to determining that the client device has the configuration control right, update the configuration of the client device; and
upon ensuring, by the RACM, that the client device satisfies the one or more access compliance conditions, establish the connection to the remote application server running the published resources.

14. The non-transitory computer readable storage medium of claim 13, wherein the processing device is further to:
after establishing the connection to the remote application server, determine one or more of the published resources related to the client device;
determine whether the client device has full access or partial access to the one or more published resources based on the updated configuration; and
provide a list of the one or more published resources indicating whether the client device has the access to the one or more published resources for presentation on the client device.

15. The non-transitory computer readable storage medium of claim 14, wherein to determine whether the client device has the full access or partial access to the one or more published resources based on the updated configuration, the processing device is further to:
determine whether the updated configuration of the client device satisfies one or more mandatory access compliance conditions in the one or more access compliance conditions; and
responsive to determining that the updated configuration of the client device does not satisfy the one or more mandatory access compliance conditions, determine that the client device has no access to the one or more published resources.

16. The non-transitory computer readable storage medium of claim 13, wherein the processing device is further to:
responsive to determining that the client device does not have the configuration control right, determine whether the remote application server has the configuration control right to update the configuration of the client device to satisfy the one or more access compliance conditions.

17. The non-transitory computer readable storage medium of claim 16, wherein the processing device is further to:
responsive to determining that the remote application server has the configuration control right, transmit a configuration update request to update the configuration of the client device from the client device to the remote application server; and
responsive to determining that the remote application server does not have the configuration control right, provide an instruction to update the configuration for presentation on the client device.

* * * * *